United States Patent
Evans et al.

(10) Patent No.: US 9,951,645 B2
(45) Date of Patent: Apr. 24, 2018

(54) GAS TURBINE ENGINE

(71) Applicant: ROLLS-ROYCE PLC, London (GB)

(72) Inventors: Dale Edward Evans, Derby (GB); Ewan Fergus Thompson, Derby (GB)

(73) Assignee: ROLLS-ROYCE plc, London (GB)

( * ) Notice: Subject to any disclaimer, the term of this patent is extended or adjusted under 35 U.S.C. 154(b) by 323 days.

(21) Appl. No.: 14/700,935

(22) Filed: Apr. 30, 2015

(65) Prior Publication Data

US 2015/0330247 A1    Nov. 19, 2015

(30) Foreign Application Priority Data

May 16, 2014  (GB) .................................. 1408688.8

(51) Int. Cl.
*F01D 5/02* (2006.01)
*F01D 21/04* (2006.01)
(Continued)

(52) U.S. Cl.
CPC ............ *F01D 21/045* (2013.01); *F01D 5/02* (2013.01); *F01D 11/12* (2013.01); *F01D 25/24* (2013.01);
(Continued)

(58) Field of Classification Search
None
See application file for complete search history.

(56) References Cited

U.S. PATENT DOCUMENTS

| | | | | |
|---|---|---|---|---|
| 4,149,824 A | * | 4/1979 | Adamson | F01D 21/006 415/197 |
| 6,695,574 B1 | * | 2/2004 | Mather | F01D 21/045 415/121.2 |

(Continued)

FOREIGN PATENT DOCUMENTS

| | | |
|---|---|---|
| EP | 2290199 A2 | 3/2011 |
| EP | 2 620 654 A1 | 7/2013 |

(Continued)

OTHER PUBLICATIONS

Sep. 15, 2015 Search Report in European Patent Application No. 15 16 5964.

(Continued)

*Primary Examiner* — Woody Lee, Jr.
*Assistant Examiner* — Theodore Ribadeneyra
(74) *Attorney, Agent, or Firm* — Oliff PLC (57) ABSTRACT

A fan containment system for fitment around an array of radially extending fan blades mounted on a hub in an axial gas turbine engine. The fan containment system comprises an annular casing element for encircling an array of fan blades. An annular fan track liner is positioned substantially coaxial to the annular casing element. A hook projects in a generally radially inward direction from the annular casing element and is positioned axially forward of an array of fan blades when the fan containment system is fitted around said fan blades. Tabs protrude from the hook in a generally rearward direction and are spaced circumferentially along the hook. Fasteners connect the fan track liner to the tabs. The fasteners are configured so as to permit movement of the fan track liner towards the annular casing element when the fan track liner is impacted by a released fan blade.

20 Claims, 9 Drawing Sheets

(51) Int. Cl.
*F01D 25/24* (2006.01)
*F01D 11/12* (2006.01)
*F02K 3/06* (2006.01)

(52) U.S. Cl.
CPC .............. *F01D 25/246* (2013.01); *F02K 3/06* (2013.01); *F05D 2220/32* (2013.01); *F05D 2240/14* (2013.01)

(56) References Cited

U.S. PATENT DOCUMENTS

| | | | | |
|---|---|---|---|---|
| 8,591,172 | B2* | 11/2013 | Bottome | F01D 21/045 415/126 |
| 2005/0271503 | A1* | 12/2005 | Harper | F01D 21/045 415/170.1 |
| 2006/0292002 | A1* | 12/2006 | Sathianathan | F01D 21/045 415/173.3 |
| 2008/0075587 | A1* | 3/2008 | Lenk | F01D 21/00 415/200 |
| 2011/0044806 | A1* | 2/2011 | Harper | F01D 21/045 415/182.1 |
| 2012/0224949 | A1* | 9/2012 | Harper | F01D 21/045 415/9 |
| 2013/0032669 | A1* | 2/2013 | Porte | B64D 33/02 244/131 |
| 2013/0136577 | A1* | 5/2013 | Evans | F01D 21/045 415/9 |
| 2014/0227076 | A1 | 8/2014 | Hoyland et al. | |

FOREIGN PATENT DOCUMENTS

| | | | |
|---|---|---|---|
| EP | 2 902 592 A1 | 8/2015 | |
| EP | 2902593 A1 * | 8/2015 | ........... F01D 21/045 |
| GB | 2488629 A | 9/2012 | |

OTHER PUBLICATIONS

Nov. 24, 2014 Search Report issued in Application No. GB1408688.8.

* cited by examiner

GAS TURBINE ENGINE

FIELD OF INVENTION

The invention relates to a fan containment system and/or a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

To satisfy regulatory requirements, such engines are required to demonstrate that if part or all of a fan blade were to become detached from the remainder of the fan, that the detached parts are suitably captured within the engine containment system.

The fan is radially surrounded by a fan casing. It is known to provide the fan casing with a fan track liner and a containment system designed to contain any released blades or associated debris. Often, the fan track liner can form part of the fan containment system.

The fan track liner typically includes an annular layer of abradable material which surrounds the fan blades. During operation of the engine, the fan blades rotate freely within the fan track liner. At maximum speed the blades may cut a path into this abradable layer creating a seal against the fan casing and minimising air leakage around the blade tips during cruise. Further incursions can occur during gusts or take off rotations over time.

Swept fan blades are increasingly used in turbofan engines as they offer significant advantages in efficiency over conventional fan blades. Swept fan blades have a greater chord length at their central portion than conventional fan blades. This greater chord length means that ice that forms on a swept fan blade follows the same rearward and outward path as on a conventional fan blade but may reach a radially outer tip of the blade before it reaches the trailing edge. The ice will therefore be shed from the blade tip and may strike the fan track liner within the blade off zone (that is the region where a blade would contact the fan track liner in the event of a blade being detached from the fan).

A fan track liner used with a swept fan blade is therefore required to be strong enough to resist ice impact whilst allowing a detached fan blade to penetrate and be contained therewithin.

In recent years there has been a trend towards the use of lighter fan blades, which are typically either of hollow metal or of composite construction. These lighter fan blades have similar impact energy per unit area as an ice sheet, which makes it more difficult to devise a casing arrangement that will resist the passage of ice and yet not interfere with the trajectory of a released fan blade.

Figure 1:
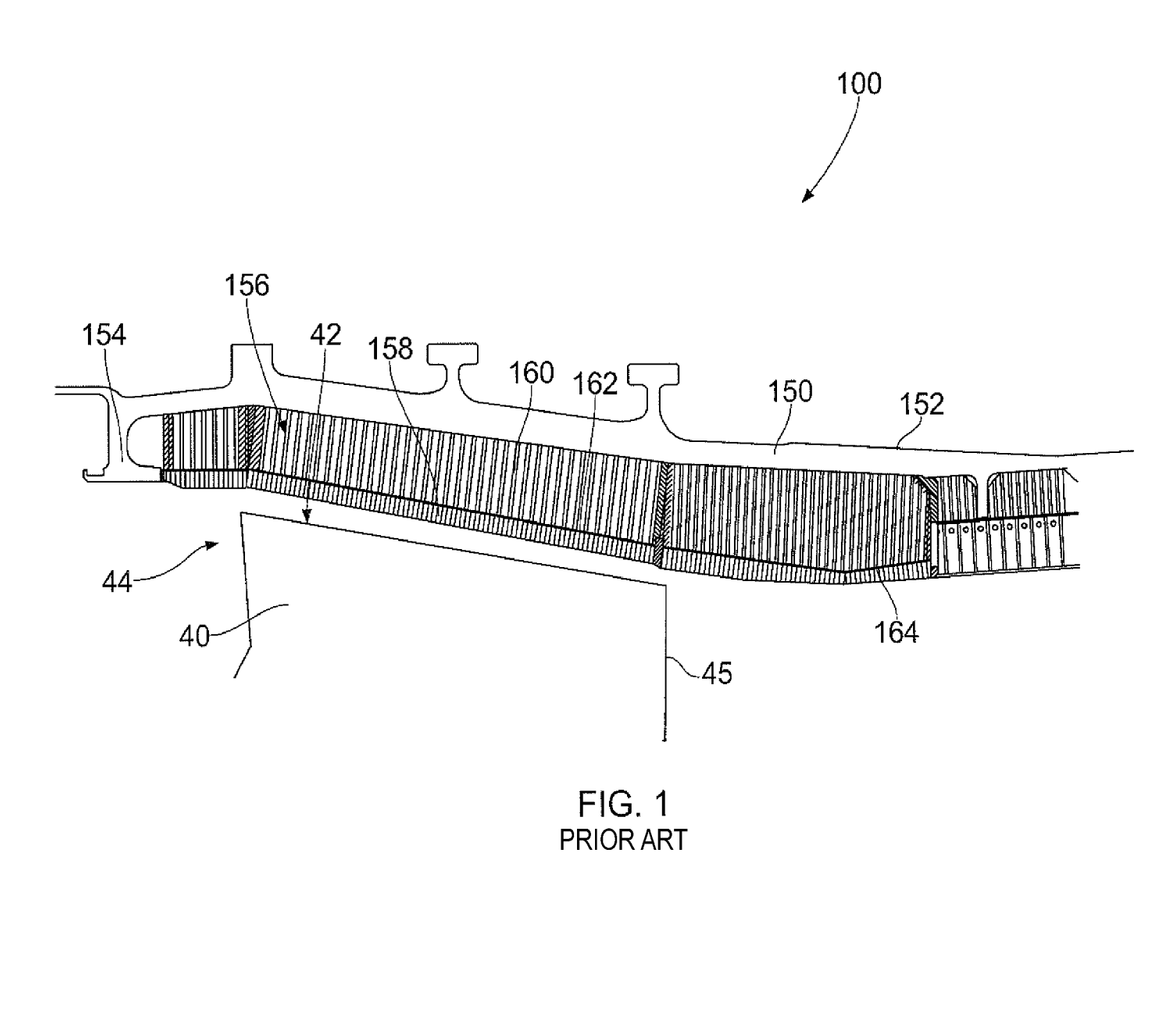
FIG. 1 illustrates a partial view of a cross-section through a typical fan case arrangement of a gas turbine engine of the prior art.

A conventional fan containment system or arrangement 100 is illustrated in FIG. 1 and surrounds a fan comprising an array of radially extending fan blades 40. Each fan blade 40 has a leading edge 44, a trailing edge 45 and fan blade tip 42. The fan containment arrangement 100 comprises a fan case 150. The fan case 150 has a generally frustoconical or cylindrical annular casing element 152 and a hook 154. The hook 154 is positioned axially forward of an array of radially extending fan blades 40. A fan track liner 156 is mechanically fixed or directly bonded to the fan case 150. The fan track liner 156 may be adhesively bonded to the fan case 150. The fan track liner 156 is provided as a structural intermediate to bridge a deliberate gap provided between the fan case 150 and the fan blade tip 42.

The fan track liner 156 has, in circumferential layers, an attrition liner 158 (also referred to as an abradable liner or an abradable layer), an intermediate layer which in this embodiment is a honeycomb layer 160, and a septum 162. The septum layer 162 acts as a bonding, separation, and load spreading layer between the attrition liner 158 and the honeycomb layer 160. The honeycomb layer 160 may be an aluminum honeycomb. The tips 42 of the fan blades 40 are intended to pass as close as possible to the attrition liner 158 when rotating. The attrition liner 158 is therefore designed to be abraded away by the fan blade tips 42 during abnormal operational movements of the fan blade 40 and to just touch during the extreme of normal operation to ensure the gap between the rotating fan blade tips 42 and the fan track liner 156 is as small as possible without wearing a trench in the attrition liner 158. During normal operations of the gas turbine engine, ordinary and expected movements of the fan blade 40 rotational envelope cause abrasion of the attrition liner 158. This allows the best possible seal between the fan blades 40 and the fan track liner 156 and so improves the effectiveness of the fan in driving air through the engine.

The purpose of the hook 154 is to ensure that, in the event that a fan blade 40 detaches from the rotor of the fan 12, the fan blade 40 will not be ejected through the front, or intake, of the gas turbine engine. During such a fan-blade-off event, the fan blade 40 is held by the hook 154 and a trailing blade (not shown) then forces the held released blade rearwards where the released blade is contained. Thus the fan blade 40 is unable to cause damage to structures outside of the gas turbine engine casings.

As can be seen from FIG. 1, for the hook 154 to function effectively, a released fan blade 40 must penetrate the attrition liner 158 in order for its forward trajectory to intercept with the hook. If the attrition liner 158 is too hard then the released fan blade 40 may not sufficiently crush the fan track liner 156.

However, the fan track liner 156 must also be stiff enough to withstand the rigours of normal operation without sustaining damage. This means the fan track liner 156 must be strong enough to withstand ice and other foreign object impacts without exhibiting damage for example. Thus there is a design conflict, where on one hand the fan track liner 156 must be hard enough to remain undamaged during normal operation, for example when subjected to ice impacts, and on the other hand allow the tip 42 of the fan blade 40 to penetrate the attrition liner 158. It is a problem of balance in making the fan track liner 156 sufficiently hard enough to sustain foreign object impact, whilst at the same time, not be so hard as to alter the preferred hook-interception trajectory of a fan blade 40 released from the rotor. Ice that impacts the fan casing rearwards of the blade position is resisted by a reinforced rearward portion 164 of the fan track liner.

Figure 2:
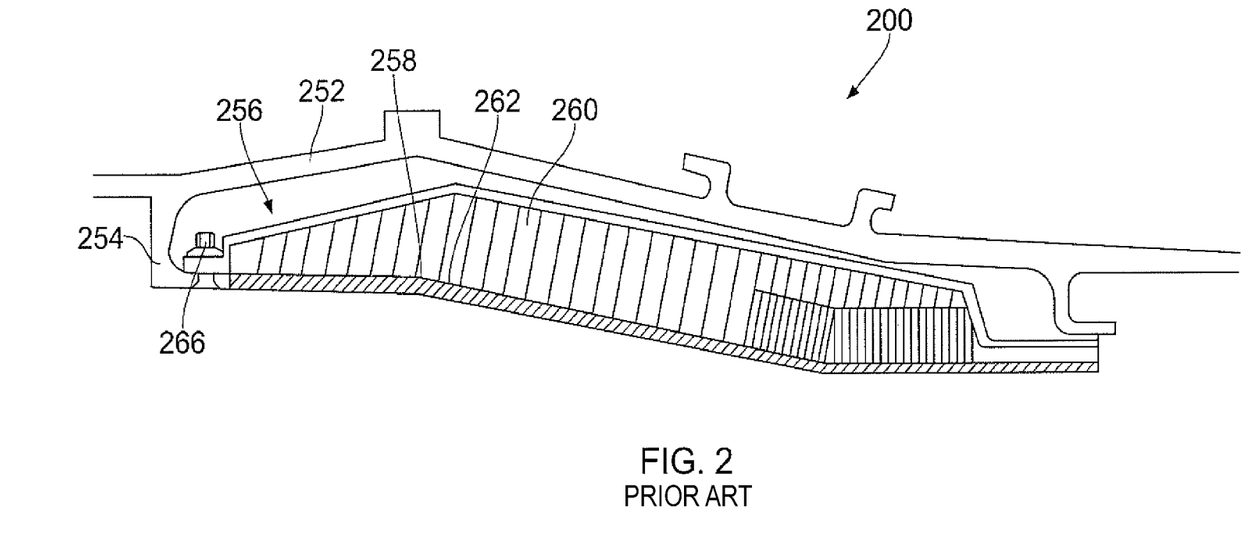
FIG. 2 illustrates a partial view of a cross-section through an alternative fan case arrangement of a gas turbine engine of the prior art.

An alternative fan containment system is indicated generally at 200 in FIG. 2. The fan containment system 200 includes a fan track liner 256 that is connected to the fan casing 250 at both an axially forward position and an axially rearward position. At the axially forward position, the fan track liner is connected to the casing at hook 254 via a fastener 266 that is configured to fail at a predetermined load. In the event of a fan blade detaching from the remainder of the fan, the fan blade impacts the fan track liner 256, the fastener 266 fails and the fan track liner pivots about a rearward point on the fan track liner. Such an arrangement is often referred to as a trap door arrangement. The trap door arrangement has been found to help balance the requirements for stiffness of the fan track liner with the requirements for resistance of operational impacts (e.g. ice impacts) ensuring a detached blade is held within the engine.

SUMMARY OF INVENTION

The present invention seeks to improve the integrity of a fan containment system. The structural integrity of the hook is important to improve the reliability of the fan containment system in a fan blade off event.

One way to improve the structural integrity of the hook would be to increase the thickness of the hook and/or make the hook from a stiffer material, but both these changes would undesirably increase the weight of the fan containment system. Furthermore, both these changes may affect the performance of the containment system in a fan blade off scenario and/or there may be limited space in the containment system to make changes to the hook design.

Accordingly, the invention seeks to provide a hook that meets the axial containment requirement whilst mitigating the risk of the integrity of the hook or casing being undermined.

A first aspect of the present invention provides a fan containment system for fitment around an array of radially extending fan blades mounted on a hub in an axial gas turbine engine. The fan containment system comprises an annular casing element for encircling an array of fan blades. An annular fan track liner is positioned substantially coaxial to the annular casing element. A hook projects in a generally radially inward direction from the annular casing element and is positioned axially forward of an array of fan blades when the fan containment system is fitted around said fan blades. Tabs protrude from the hook in a generally rearward direction and are spaced circumferentially along the hook. Fasteners connect the fan track liner to the tabs. The fasteners are configured so as to permit movement of the fan track liner towards the annular casing element when the fan track liner is impacted by a released fan blade.

The tabs are discrete features and as such the tabs do not substantially deform when a fan case, comprising the annular casing element and hook, moves out-of-round. This means that the risk of cracking of the hook is mitigated by the provision of tabs.

In the present application, an axial direction refers to a direction substantially parallel to a longitudinal axis of annular casing element. Forward and rearward directions are defined with respect to axial airflow through the fan containment system during operation of a gas turbine engine. A circumferential direction refers to a direction substantially parallel to the circumference of the annular casing element and a radial direction refers to a direction extending substantially parallel to a direction extending directly from the longitudinal axis of the annular casing element to the circumferential extent of the annular casing element.

Each tab may comprise a hole. A fastener may be received in the hole of each of the tabs. The fastener and hole may extend radially through the tab. The fastener may extend radially through the fan track liner panel.

The tabs may be considered to be projections. The tabs may be connected to or preferably formed integrally with the hook.

Each tab may comprise a weakened region, for example a weakened region between the hole and the remainder of the hook. The weakened region may comprise one or more holes or recesses and or a thinned region in a radial or circumferential direction.

The tabs each may comprise a necked portion. For example, each tab may comprise a region that is circumferentially narrow compared to a region of connection with the fastener. The necked portion may be positioned proximal to the hook and the position of connection with the fastener may be positioned distal to the hook. The necked portion provides less resistance when impacted by a released blade which increases the likelihood of the fan blade impacting with the hook and being contained. The necked portion also helps attract or isolate cracks rather than the cracks propagating axially forward into the hook.

A radially inner face of the hook may be substantially aligned with a radially inner face of the fan track liner.

Each tab may have a radial thickness substantially equal to the radial thickness of a region of the hook proximal to the tab. Increasing the radial thickness of the tab increases its stiffness, which can contribute to reducing vibration of the fan track liner during operation of the gas turbine engine and speed up fastener failure to actuate the trapdoor (i.e. permit the fan track liner to move radially towards the annular casing element) as required during fan blade off (i.e. when a fan blade or part of a fan blade is released).

The hook may have a radial component extending radially inward from the annular casing element, and an axial component extending axially rearward from the radial component. The tab may be of similar thickness (e.g. substantially the same thickness) as a portion of the axial component proximal to the tab.

The fan track liner may comprise a plurality of arcuate fan track liner panels positioned substantially coaxially so as to define the annular fan track liner.

Each fan track liner panel may comprise a lead-in feature configured to encourage a released fan blade to impact the hook.

Each fan track liner panel may comprise a recess in a region proximal to the hook. For example, each fan track liner panel may comprise a recess on a gas washed surface. The recess may be provided in a forward region of the fan track liner and extend partially along the circumferential width of the panel. The recess may be provided in a region adjacent (e.g. directly adjacent) a neighbouring fan track liner panel.

The recess may increase in circumferential width from a position part way along the axial length of the fan track liner to a region adjacent the hook. For example the circumferential width may increase linearly.

The radial thickness of the recess may increase from an axial rearward position to an axially forward position. The maximum thickness of the recess may be at a position adjacent the hook.

A portion of the recess may have a constant radial thickness in a circumferential direction.

A portion of the recess may have a decreasing radial thickness in a circumferential direction. The radial thickness of the recess may decrease in a direction of rotation of a fan blade about which the fan containment system is arranged.

A resiliently deformable member may be received in the recess. For example an elastomer may be positioned in the recess.

The recess may have a maximum radial thickness equal to or between 1 and 5 mm.

The tab may have a rounded portion or a square portion. For example, in embodiments where the tab comprises a necked portion, the rounded or square portion may be provided adjacent the necked portion and distal to the hook.

A second aspect of the invention provides a fan containment system for fitment around an array of radially extending fan blades mounted on a hub in an axial gas turbine engine. The fan containment system comprises an annular casing element for encircling an array of fan blades. An annular fan track liner is positioned substantially coaxial to the annular casing element and defined by a plurality of adjacent arcuate fan track liner panels. A hook projects in a generally radially inward direction from the annular casing element and positioned axially forward of an array of fan blades when the fan containment system is fitted around said fan blades. Fasteners connect each of the fan track liner panels to the hook. The fasteners are configured so as to permit movement of the fan track liner towards the annular casing element when the fan track liner is impacted by a released fan blade. Each fan track liner panel comprises a recess on a gas washed surface. The recess is provided in a forward region of the fan track liner and extends partially along the circumferential width of the panel (i.e. the recess extends along only part of the circumferential width of the fan track liner panel).

The recess may be provided in a region adjacent (e.g. directly adjacent) a neighbouring fan track liner panel.

The fan containment system of the second aspect may have any, or any combination, of features of the fan containment system of the first aspect.

A third aspect of the invention provides a gas turbine engine comprising the fan containment system according to the first or second aspect.

DESCRIPTION OF DRAWINGS

The invention will now be described, by way of example only, with reference to the accompanying drawings in which.

DETAILED DESCRIPTION

Figure 3:
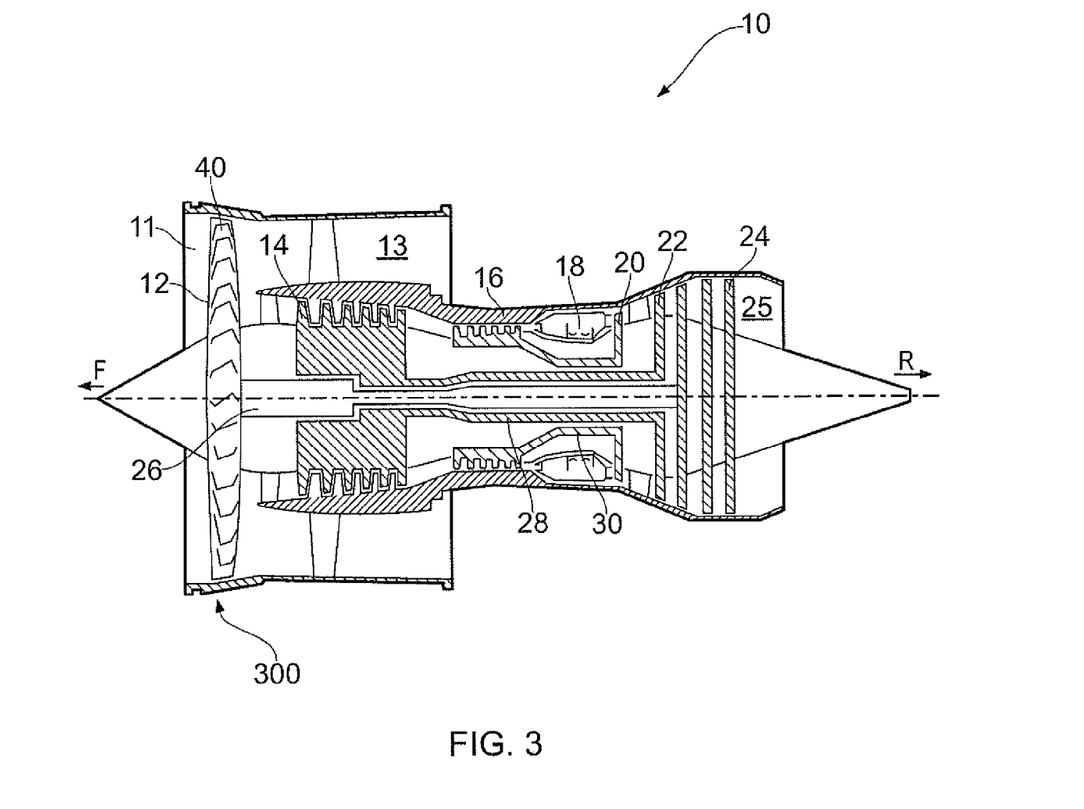
FIG. 3 illustrates a cross-section through the rotational axis of a high-bypass gas turbine engine.

With reference to FIG. 3 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 18, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. FIG. 3 shows that the fan 12 is surrounded by a fan containment system 300 that also forms one wall or a part of the bypass duct 13.

In the present application a forward direction (indicated by arrow F in FIG. 3) and a rearward direction (indicated by arrow R in FIG. 3) are defined in terms of axial airflow through the engine 10. An axial direction refers to a direction along the longitudinal axis of the gas turbine engine, a circumferential direction refers to a direction around the circumference of the fan case of the gas turbine engine, and a radial direction is a direction extending from and perpendicular to the longitudinal axis of the gas turbine engine and perpendicular to the circumferential direction.

Referring now to FIGS. 4 to 8, the fan containment system 300 is shown in more detail. The fan containment system 300 comprises a fan case 350. The fan case 350 includes an annular casing element 352 that, in use, encircles the fan blades (not shown in FIG. 4, but indicated at 40 in FIG. 3) of the gas turbine engine (indicated at 10 in FIG. 3). The fan case 350 further includes a hook 354 (which may also be referred to as a fence) that projects from the annular casing element in a generally radially inward direction. The hook 354 is positioned, in use, axially forward of the fan blades and the hook is arranged so as to extend axially inwardly, such that in a fan blade off scenario the hook 354 prevents the fan blade from exiting the engine through the air intake duct (indicated at 11 in FIG. 3).

Figure 4:
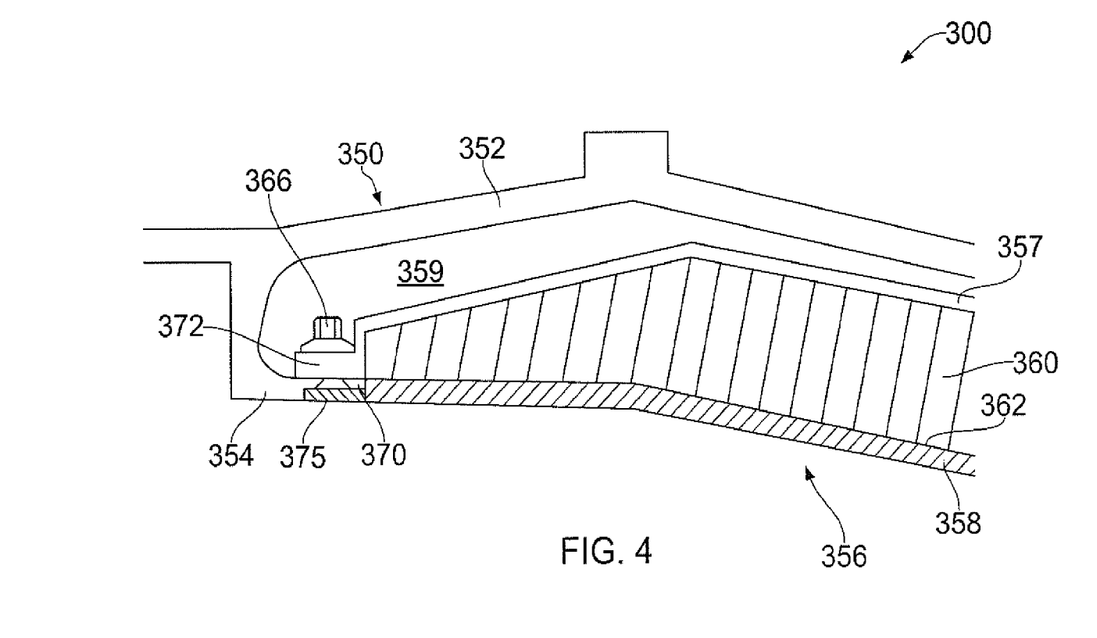
FIG. 4 illustrates a partial cross-section through a fan containment system.
Figure 5:
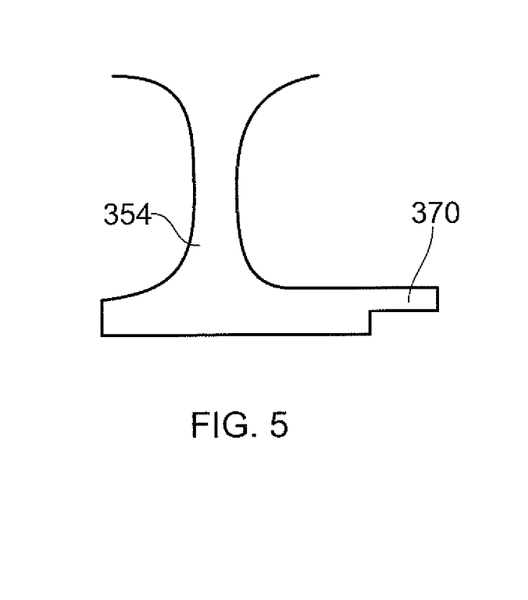
FIG. 5 illustrates a side view of a hook of the fan containment system of FIG. 4.
Figure 6:
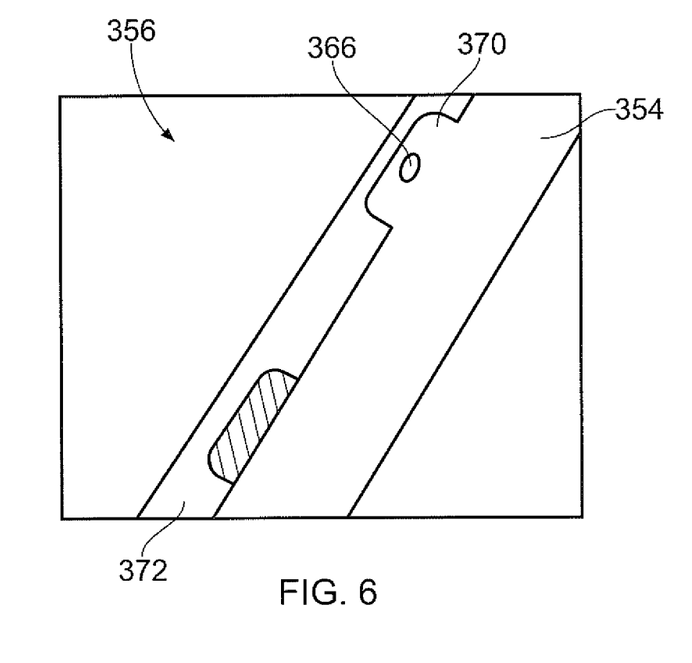
FIG. 6 illustrates a partial plan view of the hook and fan track liner of the fan containment system of FIG. 4, filler is removed from one region so that an illustration of a tab and fastener of the containment system is visible.

In the present embodiment, the hook 354 is substantially L-shaped and has a radial component extending radially inwards from the annular casing element 352 and an axial component extending axially rearward towards the fan blades from the radial component.

A fan track liner 356 is provided. The fan track liner 356 is annular and is positioned substantially coaxial to and radially inward of the annular casing element 352. A rearward end of the fan track liner 356 is connected to the fan case 350 using methods known in the art. The fan track liner 356 includes a tray 357 to which an intermediate layer 360 is connected (e.g. bonded), in this embodiment the intermediate layer is a honeycomb layer. An attrition layer 358 is positioned, in use, proximal to the fan blades 40. A septum layer 362 provides an interface between the attrition layer and the intermediate layer, forming part of the bond between the two. The septum layer 362 also separates the attrition layer and the intermediate layer and distributes any applied load between the attrition layer and the intermediate layer.

The fan track liner 356 is spaced radially inward from the casing element 352 so that a voidal region 359 is formed between the fan track liner 356 and the casing element 352.

Figure 7:
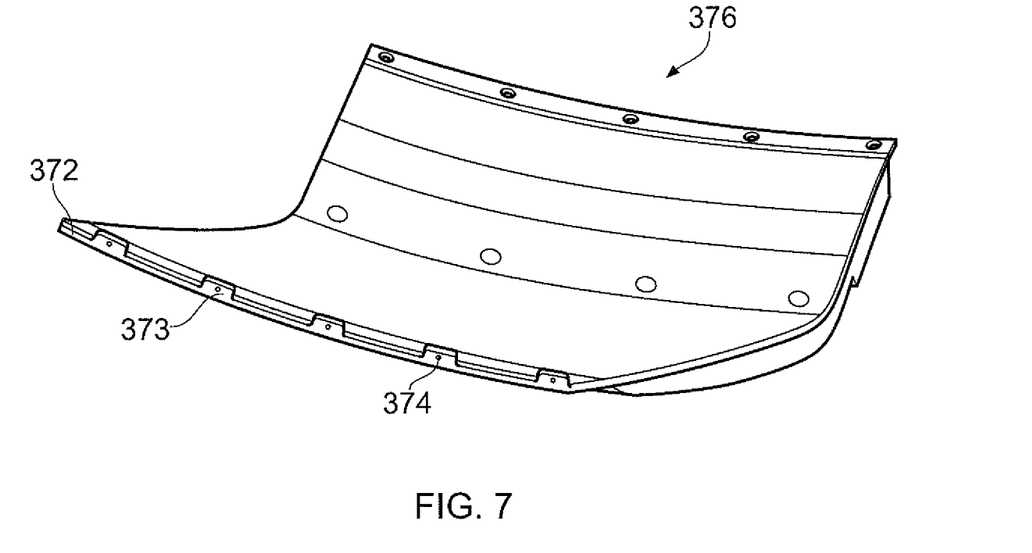
FIG. 7 illustrates a perspective view of a fan track liner panel of the fan containment system of FIG. 4.

In the present embodiment, the fan track liner is formed of a plurality of adjacent arcuate panels arranged to be substantially coaxial. As shown in FIG. 7, the fan track liner panels 376 include a forward region angled circumferentially in the direction of rotation of the fan about which the fan track liner is arranged. However, as will be described later, the fan track liner panels may be of any suitable shape, for example the fan track liner panels may be straight sided.

The hook 354 includes a plurality of tabs 370 protruding axially rearward, i.e. towards the fan track liner. The tabs 370 are circumferentially spaced along the hook.

The fan track liner 356 comprises a lip 372 in a forwardmost region of the liner. The lip is seated on the tabs 370. Referring to FIG. 7, it can be seen that the lip 372 of the fan track liner panel includes depressions 373 (only one labelled for clarity) to accommodate the tabs 370.

A fastener 366 is received in a hole provided in each tab 370 and one of a plurality of holes 374 provided in the lip 372. The fastener secures the fan track liner 356 to the tabs. In the present embodiment the fastener is a countersunk screw and basket nut configured to shear at a predetermined load so as to permit a fan track liner panel to move radially towards the annular casing element 352. However, in alternative embodiments any suitable fastener that permits movement of a fan track liner panel towards the annular casing element 352 when said panel is impacted by a released fan blade may be provided.

The tab 370 has a reduced radial thickness compared to the axial component of the hook. The reduced thickness of the tab provides a step to resist tab crack propagation into the hook 354. Filler 375 is provided in the gap created between the hook and the fan track liner in the region of the tab so as to form a smooth gas washed surface. However, in alternative embodiments the tab may have the same radial thickness as the hook.

In use, when a fan blade or part of a fan blade is released from the hub, the fan blade impacts one of the fan track liner panels. The impact causes the fastener 366 to shear permitting the impacted fan track liner panel to move radially inwardly towards the annular casing element 352. The fan blade or part of the fan blade will move towards the hook 366. If the fan blade impacts a tab, the tab is intended to shear or buckle so as to encourage the fan blade to impact the hook.

The tabs 370 are discrete features and as such the tabs do not deform when the fan case 350 moves out-of-round. This means that the risk of cracking of the hook 354 is mitigated by the provision of tabs, i.e. axial cracking from holes 374 into the hook 354 is discouraged (aided by the circumferential step provided by the reduced radial thickness of the tabs).

Figure 8:
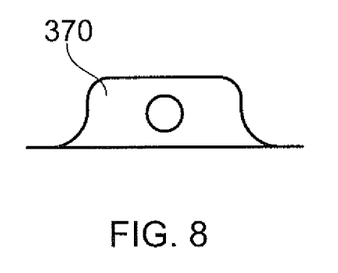
FIG. 8 illustrates a plan view of a tab of the fan containment system of FIG. 4.

Referring to FIG. 8, in the presently described embodiment the tabs 370 have a substantially rectangular surface area, the corners of the rectangle and the connection between the tab and the hook being radiussed and filleted as appropriate. As a result the tab has an area having a substantially constant width in a circumferential direction.

Figure 9:
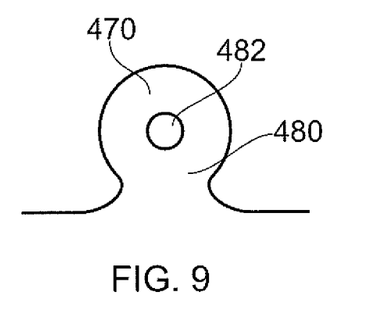
FIGS. 9 and 10 illustrate a plan view of alternative tabs for an alternative a fan containment system.

Referring now to FIG. 9 an alternative tab 470 for a fan containment system similar to the system previously described is illustrated. The tab 470 includes a necked portion 480. The necked portion has a thinner circumferential width than the remainder of the tab. Moving in an axially rearward direction from the hook 454, the tab protrudes from the hook and the circumferential width of the tab then narrows to the necked portion 480. After the necked portion the circumferential width of the tab increases in a region where the fastener is received. The portion of greater circumferential width includes a hole 482 for receiving a fastener.

Figure 10:
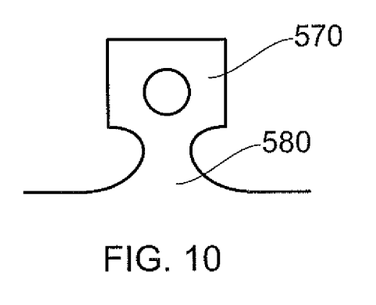

The tab 470 has a radial face that is substantially circular in the region where the fastener is received, but in alternative embodiments the tab may have any suitable shape. An example of a further alternative tab 570 is shown in FIG. 10. In the region where the fastener is received, the tab 570 includes a square portion instead of a circular portion.

The tabs 470 and 570 have a radial thickness substantially equal to the thickness of the axial component of the hook of the fan containment system.

The tabs should be sufficient in number per panel and sufficient in stiffness to raise the fan track liner natural frequencies above a level where they can be excited by the blade passing frequency. However, if the tabs are made to be too strong this can undermine containment of a released fan blade. Providing a tab with a necked portion contributes to addressing this balance of requirements.

The "full depth" of the tabs (i.e. tabs having a radial thickness substantially equal to the radial thickness of the axial component of the hook) means that the stiffness of the tabs is increased so as to sufficiently support the fan track liner panels so as to avoid excessive vibration. A necked portion 480, 580 of increased radial thickness (e.g. twice as thick) but decreased circumferential width (e.g. half as wide) has an increased moment of area (e.g. four times greater) which improves stiffness and mitigates the risk of excessive vibration during use as well as enabling load to transfer to and fail fastener 366 faster (which is beneficial to blade axial containment).

The narrow circumferential width of the necked portion 480, 580 means that the tab provides less resistance to shearing off by a released fan blade, and as such encourages axial containment of a released fan blade by the hook. The necked portion will also tend to attract cracks from hole 482 (in lieu of a step in the thickness), mitigating the risk of cracks propagating axially into the hook 354.

In the presently described embodiments five tabs 370, 470, 570 are provided per panel, but in alternative embodiments an alternative number of tabs may be provided, e.g. two or more tabs. The number of tabs required can be selected using standard modelling techniques. When the tabs having a "full depth" are used, there is no need to provide filler to smooth the gas washed surface from the hook to the fan track liner panel.

As will now be described, containment of a released fan blade can be further improved by the provision of a lead-in feature on the gas washed surface of each fan track liner panel.

Figure 11:
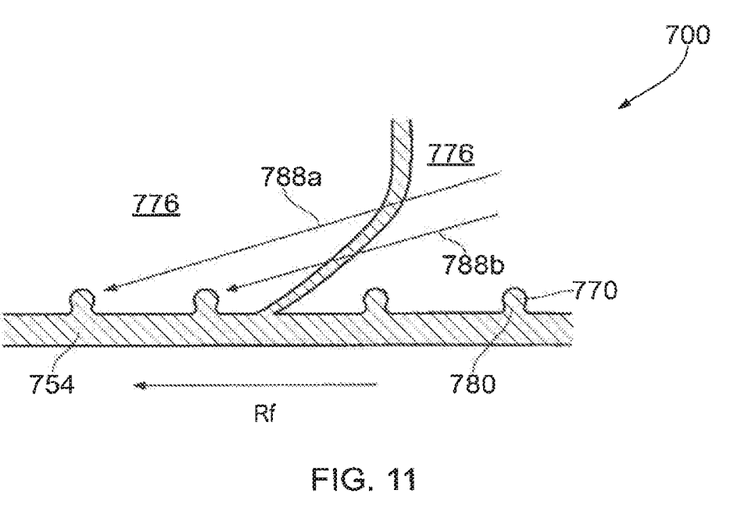
FIG. 11 illustrates a partial plan view of an alternative fan containment system.

Referring now to FIG. 11, a partial plan view of an alternative fan containment system is illustrated. Similar reference numerals are used as for the previously described fan containment system 300 of FIG. 4, but with a prefix "7" instead of "3". Only the differences between the embodiment of FIG. 4 and the embodiment of FIG. 11 will be described. The direction of rotation of the fan blade is indicated by arrow Rf.

Tabs 770 (only one labelled for clarity) project from the hook 754 in an axially rearward direction. The tabs 770 are similar to the tab 470 of FIG. 9. The tabs 770 are narrower than the tabs of 370 of the fan containment system 300. The tabs 770 are also "full depth" tabs, i.e. the thickness of the tabs is similar to the thickness of the axial component of the hook 754. Each tab includes a necked portion 780.

There is a concern that a step may be formed between neighbouring fan track liner panels 776. During use, if a released fan blade impacts a junction between the neighbouring panels in an axially rearward position (for example, following the trajectory indicated by arrow 788a) then there is sufficient time for the neighbouring panel to be activated (i.e. start to move towards the annular casing element) and the step does not create a barrier that can potentially affect blade capture. However, if the blade impacts the junction between neighbouring panels at an axially forward position (for example, following the trajector indicated by arrow 788b) there is an increased chance that the step may cause a released blade to "jump over" the hook and therefore not be effectively contained.

Figure 12:
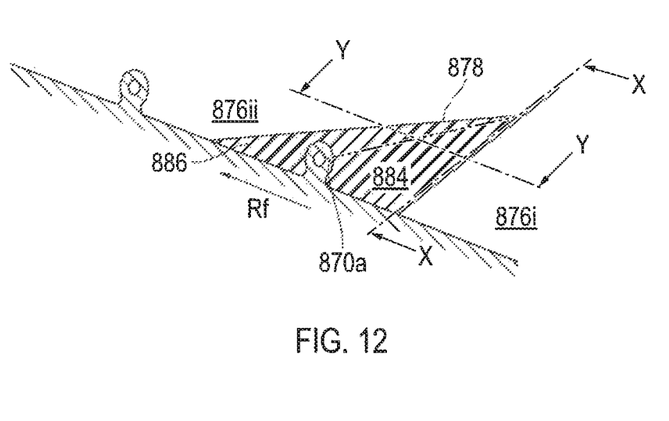
FIG. 12 illustrates a plan view of adjacent fan track liner panels of a further alternative fan containment system.

Referring to FIG. 12, an illustrative plan view of two neighbouring fan track liner panels 876i and 876ii is shown. The fan track liner panels 876i and 876ii have straight sided edges, i.e. the axial edges of the panels are substantially parallel to the longitudinal axis of the containment system.

The direction of rotation of the fan blade is indicated by arrow Rf. When a fan blade (or part of a fan blade) is released from the remainder of the fan, the fan blade will travel in the direction of rotation Rf, as well as travelling radially outward (relative to a circumference defined by the other fan blades) and axially forward. As such, if a blade is released and impacts panel 876i near the junction between panels 876i and 876ii the blade will cross the junction between panel 876i and 876ii in the direction of rotation of the fan. The fan blade trajectory is similar to that indicated at 788a and 788b in FIG. 11.

Each fan track liner panel 876i, 876ii includes a lead-in feature 878. The lead-in feature is positioned adjacent a neighbouring panel in a circumferentially upstream position with respect to the fan direction of rotation Rt (i.e. viewing from a first edge of the panel to a second edge of the panel in a direction of rotation of the fan, the lead-in feature is positioned adjacent the first edge). The lead-in feature comprises a recess on the gas washed surface of the panel 876ii. The recess starts at the edge adjacent the neighbouring panel 876i and in an axially forward position. The axially forward position is selected to be a position where the likelihood of a released fan blade not activating panel 876ii after travelling from panel 876i starts to increase, this position can be calculated using known modelling techniques.

In the present embodiment a resiliently deformable member, in this case an elastomer 882, is provided in each recess, but it is possible that the recesses will have little impact on aerodynamic forces imparted on the fan blade (subject to the number of panels chosen and the blade count) so in alternative embodiments a resiliently deformable member may not be provided. The resiliently deformable member fills the recess so as to form a smooth gas washed surface, but is easily sliced through by a released fan blade. In some cases the resiliently deformable member may be deformed upon ice impact, but will deform back to its original shape post-ice impact. The provision of the resiliently deformable member helps to satisfy the conflicting requirements of resistance to ice impact and effective fan blade containment.

The recess 880 has a triangular area on a plane defined by the axial and circumferential direction. The recess can be considered as being formed in two parts 884 and 886. Both parts 884 and 886 are triangular in area on a plane defined by the axial and circumferential direction. The circumferential width of the triangles increases towards a position adjacent the hook.

Figure 13:
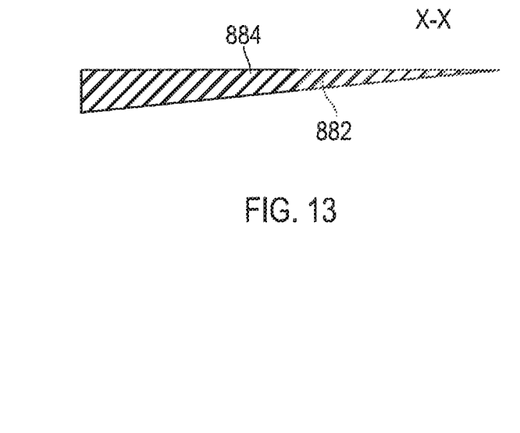
FIG. 13 illustrates a cross section through X-X of an elastomer provided in a recess of the fan track liner panels of FIG. 12.
Figure 14:
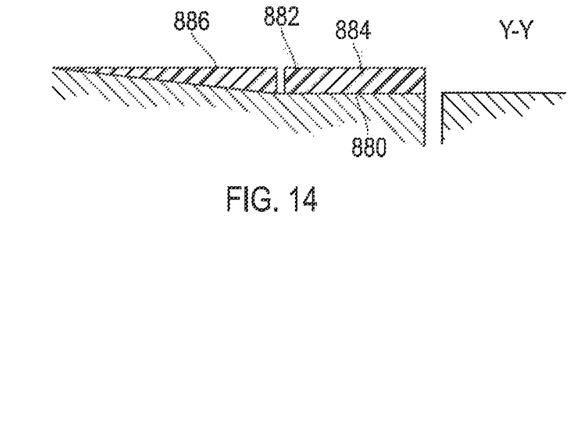
FIG. 14 illustrates a cross section through Y-Y of the fan track liner panels of FIG. 12.

Referring now to FIGS. 13 and 14, the recess 880 and therefore the elastomer 882 positioned in the recess has a variable radial depth. Referring to FIG. 13, the radial depth of the elastomer (and therefore the recess) increases in a forward direction so as to be a maximum at a position adjacent the hook. In the present embodiment the thickness increases linearly, but in alternative embodiments the increase in thickness may follow a curved profile.

The radial depth of the recess is minimal at a position furthest from the junction with neighbouring panel 876i than a position adjacent the neighbouring panel 876i. In the present embodiment, the first part of the recess 884 has a constant radial depth circumferentially, a maximum depth at the hook and a depth that reduces axially rearwards towards zero thickness. The second part of the recess 886 has a radial depth that decreases in the circumferential direction of rotation of the fan from that defined by the first part of the recess 884 to zero. In this way, the recess is blended to the remainder of the panel 876ii. In the present embodiment the maximum depth is 3 mm, but the depth may be any suitable depth.

The first part 884 of the recess is arranged so as to be adjacent a circumferentially forward portion of the first tab 870a defined by the trajectory of the released fan blade tip. The first tab refers to the first tab connected to the panel in the circumferential direction of rotation of the fan. In this way, the recess provides a lead-in to the first tab 870a. The shape of the recess means that the trajectory of a blade that is released such that it impacts the second or subsequent tabs is unaffected by the recess.

The elastomer 882 is silicon rubber, but in alternative embodiments the resiliently deformable material may comprise silcoset, polysulphide or any other suitable resiliently deformable material. The resiliently deformable member may be protected from erosion by a co-moulded fabric or glass fibre shell surface.

The fan track liner panels are manufactured using methods known in the art. Once manufactured the recess 880 can be machined into the gas washed surface of the fan track liner panel.

It will be appreciated by one skilled in the art that, where technical features have been described in association with one embodiment, this does not preclude the combination or replacement with features from other embodiments where this is appropriate.

Furthermore, equivalent modifications and variations will be apparent to those skilled in the art from this disclosure. Accordingly, the exemplary embodiments of the invention set forth above are considered to be illustrative and not limiting.

For example, the lead-in feature has been described with reference to a straight sided panel, but it may be beneficial to any fan track liner geometry, for example the swept or angled panels of FIG. 7.

As will be appreciated by the person skilled in the art, the lead-in feature will contribute to improving fan blade capture for any trap door arrangement fan containment liner system comprising a fan track liner defined by a plurality of panels, e.g. systems having panels connected directly to the hook by a fastener or otherwise (i.e. systems without tabs).

The invention claimed is:

1. A fan containment system for fitment around an array of radially extending fan blades mounted on a hub in an axial gas turbine engine, the fan containment system comprising:
an annular casing element for encircling an array of fan blades;
an annular fan track liner positioned substantially coaxial to the annular casing element;
a hook projecting in a generally radially inward direction from the annular casing element and positioned axially forward of an array of fan blades when the fan containment system is fitted around said fan blades;
a plurality of tabs protruding from the hook in a generally rearward direction and spaced circumferentially along the hook; and
a plurality of fasteners connecting the fan track liner to the tabs, wherein the fasteners are configured so as to permit movement of the fan track liner towards the annular casing element when the fan track liner is impacted by a released fan blade.

2. The fan containment system according to claim 1, wherein the tabs each comprise a necked region.

3. The fan containment system according to claim 1, wherein each tab has a radial thickness substantially equal to the radial thickness of a region of the hook proximal to the respective tab.

4. The fan containment system according to claim 1, wherein the fan track liner comprises a plurality of arcuate fan track liner panels positioned substantially coaxially so as to define the annular fan track liner.

5. The fan containment system according to claim 4, wherein each fan track liner panel comprises a lead-in feature configured to encourage a released fan blade to impact the hook.

6. The fan containment system according to claim 5, wherein each fan track liner panel comprises a recess on a gas washed surface, the recess being provided in a forward region of the fan track liner panel and extending partially along the circumferential width of the fan track liner panel.

7. The fan containment system according to claim 6, wherein the recess increases in circumferential width from a position part way along the axial length of the fan track liner to a region adjacent the hook.

8. The fan containment system according to claim 6, wherein the radial thickness of the recess increases from an axial rearward position to an axially forward position.

9. The fan containment system according to claim 6, wherein a portion of the recess has a constant radial thickness in a circumferential direction.

10. The fan containment system according to claim 6, wherein a portion of the recess has a decreasing radial thickness in a circumferential direction.

11. The fan containment system according to claim 6, wherein a resiliently deformable member is received in the recess.

12. A gas turbine engine comprising the fan containment system according to claim 1.

13. A fan containment system for fitment around an array of radially extending fan blades mounted on a hub in an axial gas turbine engine, the fan containment system comprising:
an annular casing element for encircling an array of fan blades;
an annular fan track liner positioned substantially coaxial to the annular casing element and defined by a plurality of adjacent arcuate fan track liner panels;
a hook projecting in a generally radially inward direction from the annular casing element and positioned axially forward of an array of fan blades when the fan containment system is fitted around said fan blades; and
a plurality of fasteners connecting each of the fan track liner panels to the hook, wherein the fasteners are configured so as to permit movement of the fan track liner towards the annular casing element when the fan track liner is impacted by a released fan blade,
wherein each fan track liner panel comprises a recess on a gas washed surface, the recess being provided in a forward region of the fan track liner and extending partially along the circumferential width of the panel, and wherein the recess increases in circumferential width from a position part way along the axial length of the fan track liner to a region adjacent the hook.

14. The fan containment system according to claim 13, wherein a resiliently deformable member is received in the recess.

15. The fan containment system according to claim 13, wherein the recess has a maximum radial thickness equal to or between 1 and 5 mm.

16. The fan containment system according to claim 13, wherein the radial thickness of the recess increases from an axially rearward position to an axially forward position.

17. The fan containment system according to claim 13, wherein a portion of the recess has a constant radial thickness in a circumferential direction.

18. The fan containment system according to claim 13, wherein a portion of the recess has a decreasing radial thickness in a circumferential direction.

19. A gas turbine engine comprising the fan containment system according to claim 13.

20. A fan containment system for fitment around an array of radially extending fan blades mounted on a hub in an axial gas turbine engine, the fan containment system comprising:
an annular casing element for encircling an array of fan blades;
an annular fan track liner positioned substantially coaxial to the annular casing element and defined by a plurality of adjacent arcuate fan track liner panels;
a hook projecting in a generally radially inward direction from the annular casing element and positioned axially forward of an array of fan blades when the fan containment system is fined around said fan blades; and
a plurality of fasteners connecting each of the fan track liner panels to the hook, wherein the fasteners are configured so as to permit movement of the fan track liner towards the annular easing element when the fan track liner is impacted by a released fan blade,
wherein each fan track liner panel comprises a recess on a gas washed surface, the recess being provided in a forward region of the fan track liner and extending partially along the circumferential width of the panel, and wherein a resiliently deformable member is received in the recess.

* * * * *